United States Patent [19]
Garrison

[11] Patent Number: 5,829,382
[45] Date of Patent: Nov. 3, 1998

[54] BIRDFEEDER WITH REMOVABLE BASE

[76] Inventor: William M. Garrison, 2417 Greenhill Dr., NW., Huntsville, Madison County, Ala. 35810

[21] Appl. No.: 733,657

[22] Filed: Oct. 17, 1996

Related U.S. Application Data

[60] Provisional application No. 60/005,561, Oct. 18, 1995.

[51] Int. Cl.[6] .................................................. A01K 39/01
[52] U.S. Cl. .......................................... 119/52.2; 119/57.8
[58] Field of Search ................................... 119/52.2, 57.8, 119/57.9, 52.1, 61

[56] References Cited

U.S. PATENT DOCUMENTS

| D. 115,321 | 6/1939 | Pueschel | 119/52.2 |
|---|---|---|---|
| 2,591,126 | 4/1952 | Breck, Jr. | 119/52.2 |
| 2,789,534 | 4/1957 | Landgraf | 119/52.1 |
| 2,884,899 | 5/1959 | Jackes et al. | 119/52.1 |
| 5,033,411 | 7/1991 | Brucker | 119/52.2 |
| 5,033,708 | 7/1991 | Brue et al. | 119/57.8 |
| 5,063,877 | 11/1991 | Riggi | 119/52.2 |
| 5,353,742 | 10/1994 | Mauritz | 119/52.2 |
| 5,463,979 | 11/1995 | Fasino | 119/52.2 |

Primary Examiner—Paul J. Hirsch
Attorney, Agent, or Firm—M. Clodfelter

[57] ABSTRACT

A birdfeeder conveniently separable for loading with bird feed is disclosed. The feeder is separable into two portions, with the mechanism for separating and holding the birdfeeder together being constructed completely integral with the two portions. In an upper portion, a lock rod connected to a protective top extends through a tube extending through a feed reservoir from a base of the birdfeeder, the base and reservoir being part of the lower portion. On a portion of the lock rod that extends into the base is provided a groove that is engaged by a spring-loaded pin, the pin in turn extending horizontally from the base and configured as a bird perch so that when the perch is pulled outward, the upper portion may be separated from the lower portion, providing access to fill the reservoir. Additionally, capacity of the birdfeeder is such that it will contain a relatively large quantity of bird feed, making the feed available on a more consistent basis, and increasing intervals between which the birdfeeder must be refilled.

12 Claims, 4 Drawing Sheets

BIRDFEEDER WITH REMOVABLE BASE

RELATED U.S. APPLICATION DATA

This application is a continuation-in-part of provisional application Ser. No. 60/005,561, filed Oct. 18, 1995.

FIELD OF THE INVENTION

This invention relates to animal feeding devices, and particularly to a birdfeeder conveniently separable into two integral subassemblies for filling with bird feed. An upper subassembly including a protective top for the birdfeeder is locked into the lower subassembly by a locking mechanism contained in the base of the birdfeeder.

BACKGROUND OF THE INVENTION

While birdfeeders separable into parts for filling with bird feed have been proposed, many of those birdfeeders that must be disassembled to fill with bird feed are assembled with small parts that are prone to become lost during the process of refilling the birdfeeder with bird feed. Some require tools that may also be prone to becoming lost or misplaced during the process of refilling the birdfeeder. Additionally, manipulation of these parts and tools may be difficult where an individual is attempting to reassemble a birdfeeder filled with bird feed, leading to spillage and waste. Also, birdfeeders of this type are typically provided with small feed reservoirs, meaning that the bird feeder must be frequently refilled. In addition to being inconvenient for users, a small feed reservoir may periodically allow the feed to become exhausted, discouraging birds from visiting the birdfeeder and causing them to seek food elsewhere. Further, many of these birdfeeders having relatively small feed reservoirs are provided with small openings by which to fill the reservoir, which may also result in spilled and wasted feed and attendant aggravation felt by the person refilling the birdfeeder. Further yet, many of the birdfeeders of the prior art provide the bird feed in areas that are insufficiently sheltered, in turn allowing the feed to become wetted by precipitation, resulting in spoilage of the feed and clogging of the birdfeeder. Also, such insufficiently sheltered birdfeeders expose birds visiting the birdfeeder to precipitation.

In view of the foregoing, it is an object of the invention to provide a birdfeeder separable into two main subassemblies for quickly and conveniently filling the birdfeeder with bird feed without potential loss of parts or need for associated tools. Also, it is an object of the invention to provide a birdfeeder having a relatively large feed reservoir, and further having a protective top which adequately shelters exposed feed and birds at the birdfeeder from precipitation.

SUMMARY OF THE INVENTION

A birdfeeder is provided that is separable into a first subassembly and a second subassembly. The first subassembly is constructed having a protective top for protecting birds and bird feed from precipitation. A lock rod extends downward from the protective top, and is configured at an end opposite from the top for receiving a locking member. The second subassembly includes a base with at least one cavity for receiving and holding bird feed, the base protected by the protective top. A bird feed reservoir is attached to the base and enclosed at the upper end by the top, the reservoir provided with at least one opening at a bottom end communicating with the cavity so that bird feed flows from the reservoir to the cavity as it is consumed. A tubular member extends from the base upward through the reservoir for guiding the lock rod into the base, where a locking mechanism including a locking member releasably engages the lock rod. An actuator external to the base and coupled to the locking mechanism is operated to release and engage the lock rod.

DETAILED DESCRIPTION OF THE DRAWINGS

The bird feeder of the instant invention is separable into two portions, with the mechanism for separating and holding the birdfeeder together being constructed completely integral with the two portions. As such, when separated, there are no small loose parts to become lost or which must be manipulated in order to reassemble the birdfeeder, or a need for tools to disassemble/assemble the birdfeeder. Additionally, capacity of the birdfeeder is such that it holds a relatively large quantity of bird feed, making the feed available on a more consistent basis and increasing intervals between which the birdfeeder must be refilled.

Figure 1:
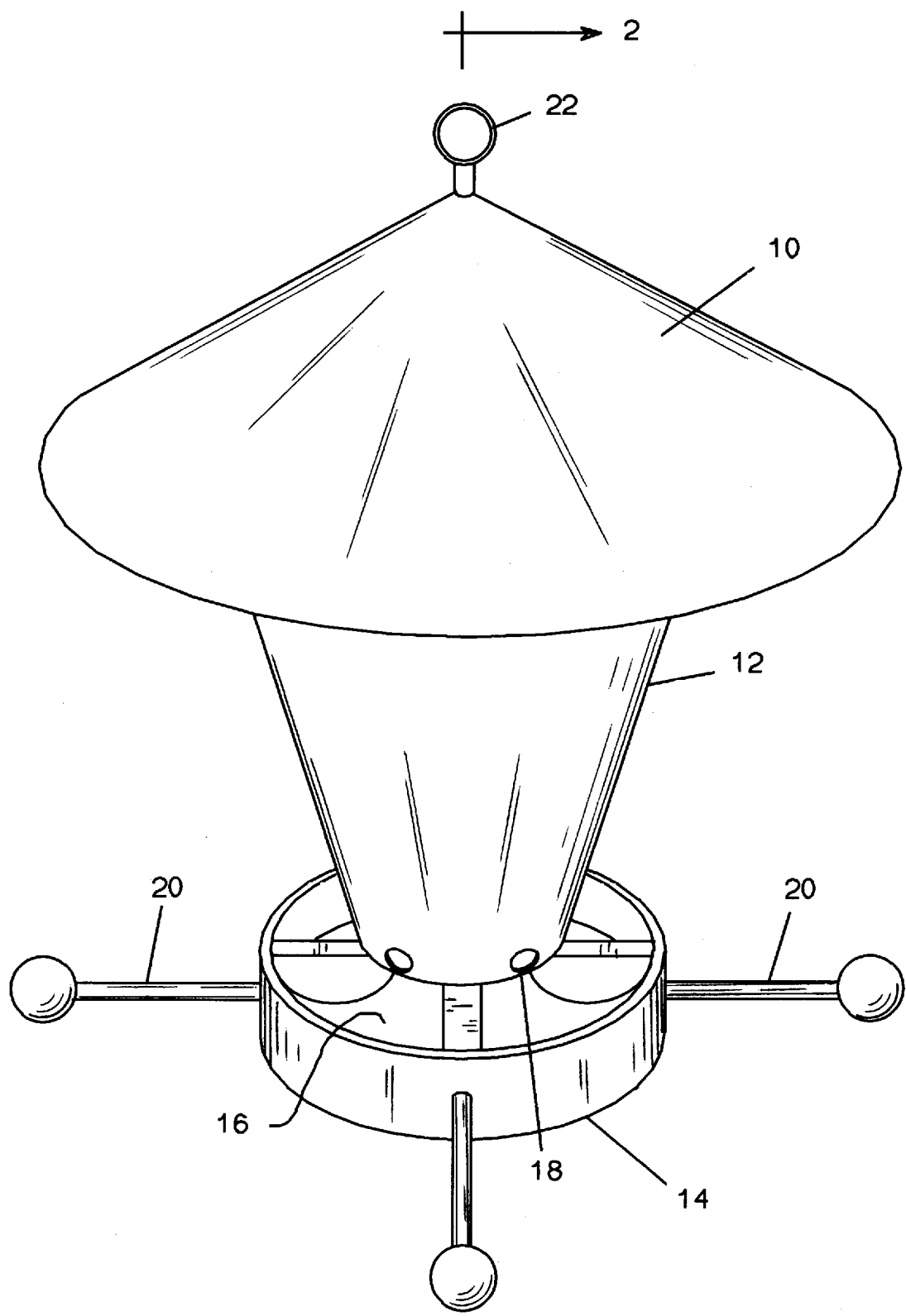
FIG. 1 is a pictorial view of one embodiment of a birdfeeder of the present invention.
Figure 2:
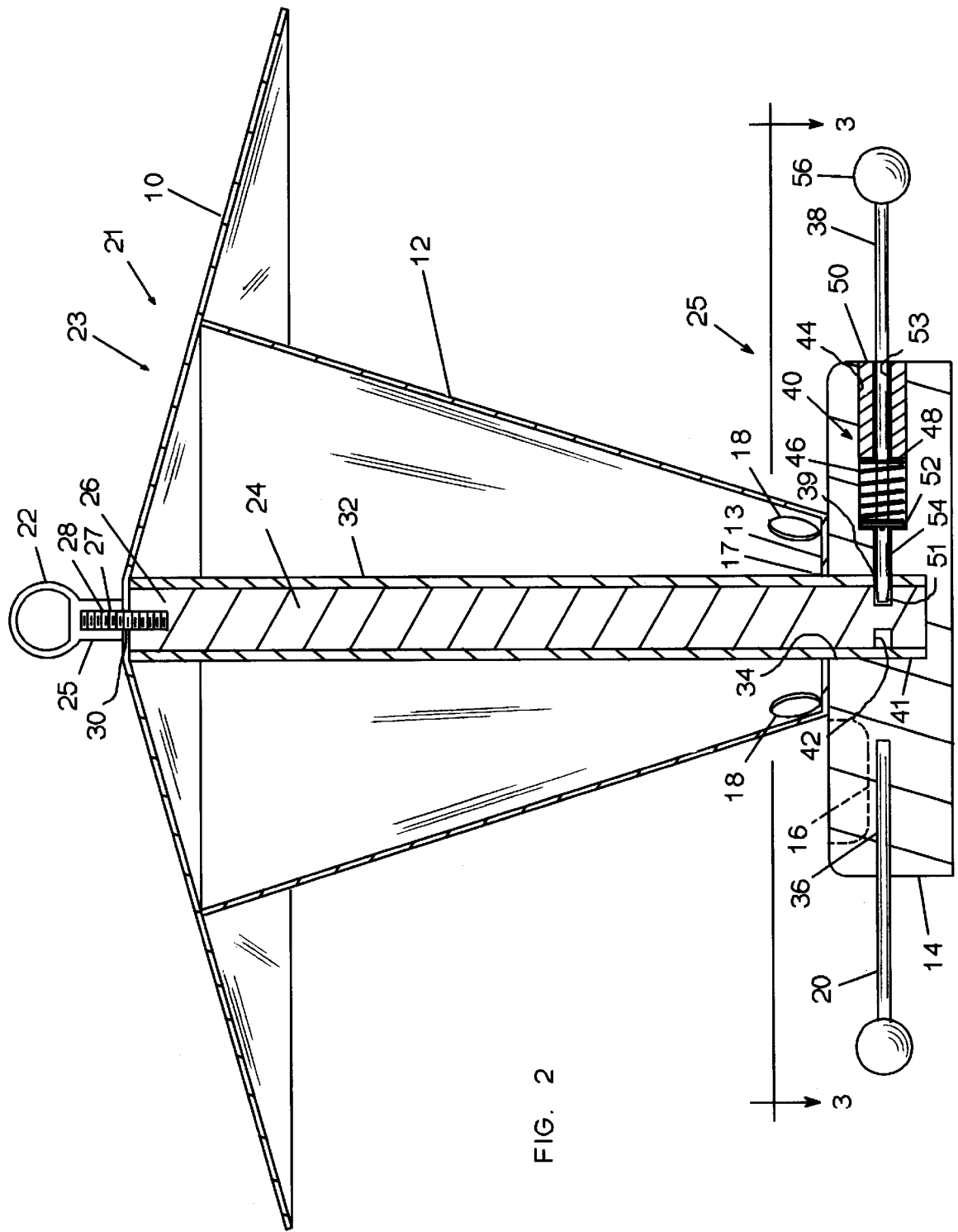
FIG. 2 is a cut-away view taken along lines 2—2 of FIG. 1.

Referring initially to FIG. 1, the birdfeeder of the instant invention is shown. A top 10 of metal or plastic and which may be about 22 inches in diameter may be configured as a flattened cone, and provides an area therebeneath sheltered from precipitation and direct sunlight. Additionally, such a large diameter of the top serves to deter squirrels from raiding the birdfeeder due to the relatively large overhang between the top and the base. Positioned below top 10 and having an upper region enclosed thereby is a reservoir 12 for containing bird feed, this reservoir 12 sized to hold approximately 5 pounds of feed. This quantity of bird feed is sold in many retail outlets in the same gallon-sized plastic container used in the sale of milk and distilled water. As such, the entire contents of the gallon-sized bird feed container may be emptied into reservoir 12, providing enough feed to last up to a month or so, depending on the number of birds visiting the birdfeeder. Significantly, reservoir 12, in the disclosed embodiment, is configured as an inverted truncated cone, so that most of the bird feed is contained substantially above and over birds visiting the birdfeeder, as shown in FIG. 2. The diameter of base 14 is about 9 inches, a diameter of less than half the diameter of top 10. This provides the bird feed held by base 14 and birds at base 14 better protection from precipitation than such protection afforded by conventional birdfeeders.

The inwardly-tapered shape of reservoir 12 enlarges the available area beneath top 10 that is sheltered from precipitation. Below reservoir 12 is mounted base 14, which base being provided with one or more cavities 16 (dashed lines in FIGS. 2 and 4) for receiving bird feed from reservoir 12. Openings 18 at a bottom of in reservoir 12 communicate with cavities 16, allowing bird feed to pass into cavities 16 by gravity as the bird feed is consumed. Perches 20 extend outwardly from sides of base 14, and may be sized to attract a particular size of bird. Where the perches are small, larger birds and squirrels are discouraged from using the birdfeeder, while smaller birds are attracted thereto. A ring 22 may be positioned above top 10 for suspending the birdfeeder from a hook or cord, or the birdfeeder may be mounted on a post, as by fasteners 15 (FIG. 3) in base 14.

As stated, and in a preferred embodiment of the instant invention, top 10 is constructed having a diameter of about 22 inches, affording shelter from downwardly falling precipitation for birds and protection of the bird feed in a cylindrical volume 22 inches in diameter extending about 8 inches or so down to base 14. The diameter of the upper end of cone-shaped reservoir 12 is about 10 inches, and the diameter at the lower end of the reservoir is about 4 inches. Height of the reservoir is about 10 inches, giving reservoir 12 an internal volume of about 753.5 cubic inches, which volume, as earlier stated, being sufficient to hold a gallon-sized container of bird feed. Alternately, the reservoir need not be configured as an inverted truncated cone; it could be any shape that tapers inward toward the base to expose more area at base 14 to contain bird feed and provide a greater area underneath top 10 within which birds may feed and rest. Where additional protection around base 14 is not desired or needed, reservoir 12 may have vertical sides, such as a cylindrical or rectilinear configuration.

Referring now to FIG. 2, a cross sectional view taken along lines 2—2 of FIG. 1, construction details of the birdfeeder are shown. Here, an upper, separable portion 21 of the birdfeeder includes top 10, ring 22, and locking rod 24. Top 10 is secured to one end 26 of rod 24 by ring 22, which includes a threaded portion 27 threaded onto a threaded stud 28. Stud 28 passes through an opening 30 in top 10, so that with top 10 in place between ring 22 and end 26 of rod 24, the described parts are held together as one integral portion 21.

The lower integral portion 25 of the birdfeeder includes base 14, which is provided with a generally centrally located guide tube 32. Tube 32 functions to prevent bird feed from clogging the locking mechanism, and further serves to guide locking rod 24 into position where it is locked in place by the locking mechanism, as will be further explained. Tube 32 is set in a bore 34 in an upper side of base 14 so that tube 32 extends upward from base 14. Reservoir 12 is also mounted to base 14, as by threaded fasteners, with a lower region of reservoir 12 being generally concentric with tube 32. Perches 20, which may be wooden or plastic dowels, are set in bores 36 provided in the side of base 14.

Figure 4:
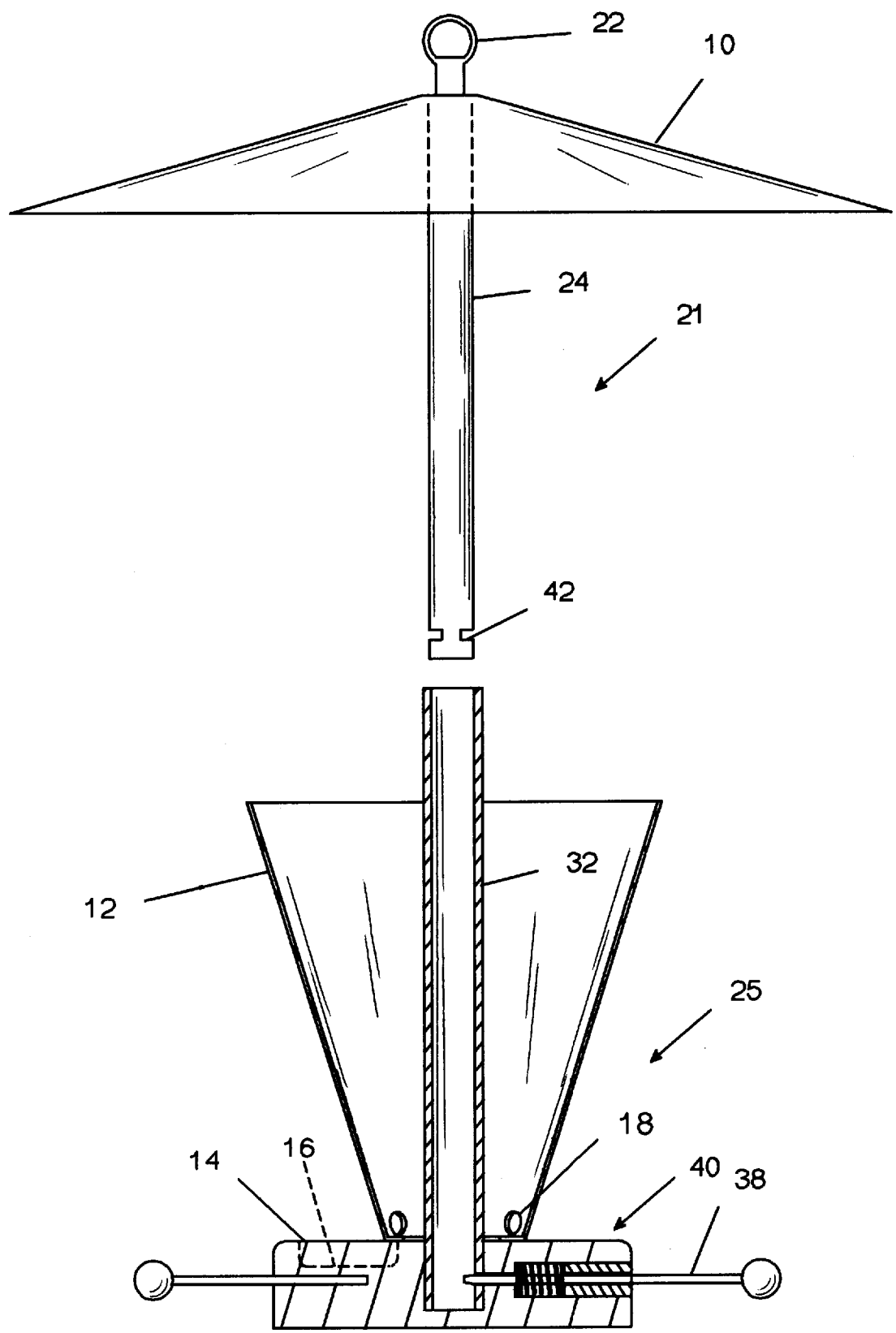
FIG. 4 is a broken away view showing the birdfeeder in a separated condition.

One of the perches, in this instance perch 38, may be incorporated in a locking mechanism 40 for releasably securing the upper portion 21 and lower portion 25 together. As shown, perch 38 is elongated so that an end 51 extends through an opening 39 in tube 32, which opening 39 communicating with a groove 42 in locking rod 24 of upper portion 21. Alternately, tube 32 need not extend so far into base 14 that it would be necessary to provide opening 39 therethrough. Here, tube 32 may terminate above opening 39 so that end 51 of perch 38 extends directly from bore 54 in base 14 to engage groove 42. A bore 44 is provided for accommodating a compression spring 46, which compression spring positioned to bear against a shoulder 48 of a plug 50 and a washer 52 affixed to perch 38. With this construction, when perch 38 is pulled outwardly against spring 46, locking rod 24 is released, allowing locking rod 24 and thus portion 21 to be separated from lower portion 25, as shown in FIG. 4. Locking mechanism 40 may incorporate a member other than a perch 38, such as a rod terminating at an outer end with a ring, knob, or other means for an individual to grip and pull to release upper portion 21. Further, an opening (not shown) may be provided in locking rod 24 instead of a groove for receiving end 51 of perch 38, with indexing or alignment means located on each of the portions so as to indicate to an individual assembling the birdfeeder alignment of end 51 with the opening. Further yet, perch 38 may simply be threaded into base 14 so that end 51 either engages groove 42 or is withdrawn therefrom. Here, the perch need not be removed from base 14, but rotated on the threads by an amount sufficient to either engage or withdraw end 51 with or from groove 42. With respect to configuration of lock rod 24, the end of lock rod 24 may be tapered so that the taper urges the perch outward as the lock rod is pushed into the base, with end 51 of the perch automatically falling into groove 42 when end 52 comes into registry with groove 42.

During construction, locking mechanism 40 may be constructed by providing a retaining stop on perch 38 where washer 52 is to be positioned. This stop may be in the form of a clip disposed in a groove around perch 38, a Cotter-type pin passing through an opening in perch 38, or by enlarging the diameter of perch 38 to provide a shoulder against which washer 52 or a spring 46 would bear. Washer 52 may be positioned against the stop from an exterior end of perch 38, followed by spring 46. A first, smaller bore 54 within which end 51 of perch 38 slidably fits is provided in base 14, bore 54 extending as shown through tube 32 to engage groove 42 in locking rod 24. As stated, bore 44 is provided to accommodate the larger size of spring 46. A plug 50 is fabricated having a bore 53 slightly larger than the diameter of perch 38 so that perch 38 may freely slide in bore 53, after which plug 50 is fixed in place in bore 44, as by bonding, threaded engagement, or any other means known to those skilled in the art. Typically, plug 50 is sized in length so as to apply slight compression against spring 46, biasing end 51 of perch 38 into groove 42, preventing the upper and lower portions from inadvertently separating. A knob 56 may be mounted on the opposite end of perch 38 so that the user may easily pull perch 38 outwardly to release the upper portion from the lower portion. Alternately, the lock mechanism may be operated by a lever instead of a perch, the lever mounted on a pin in a bottom, side, or top of base 14 and terminating with a fork or clevis arrangement. In this embodiment, a spring-loaded pin having end 51 thereon and means for engagement with the fork or clevis would be provided in base 14 so that moving the lever would withdraw end 51 from groove 42, allowing separation of portions 21 and 23.

Figure 3:
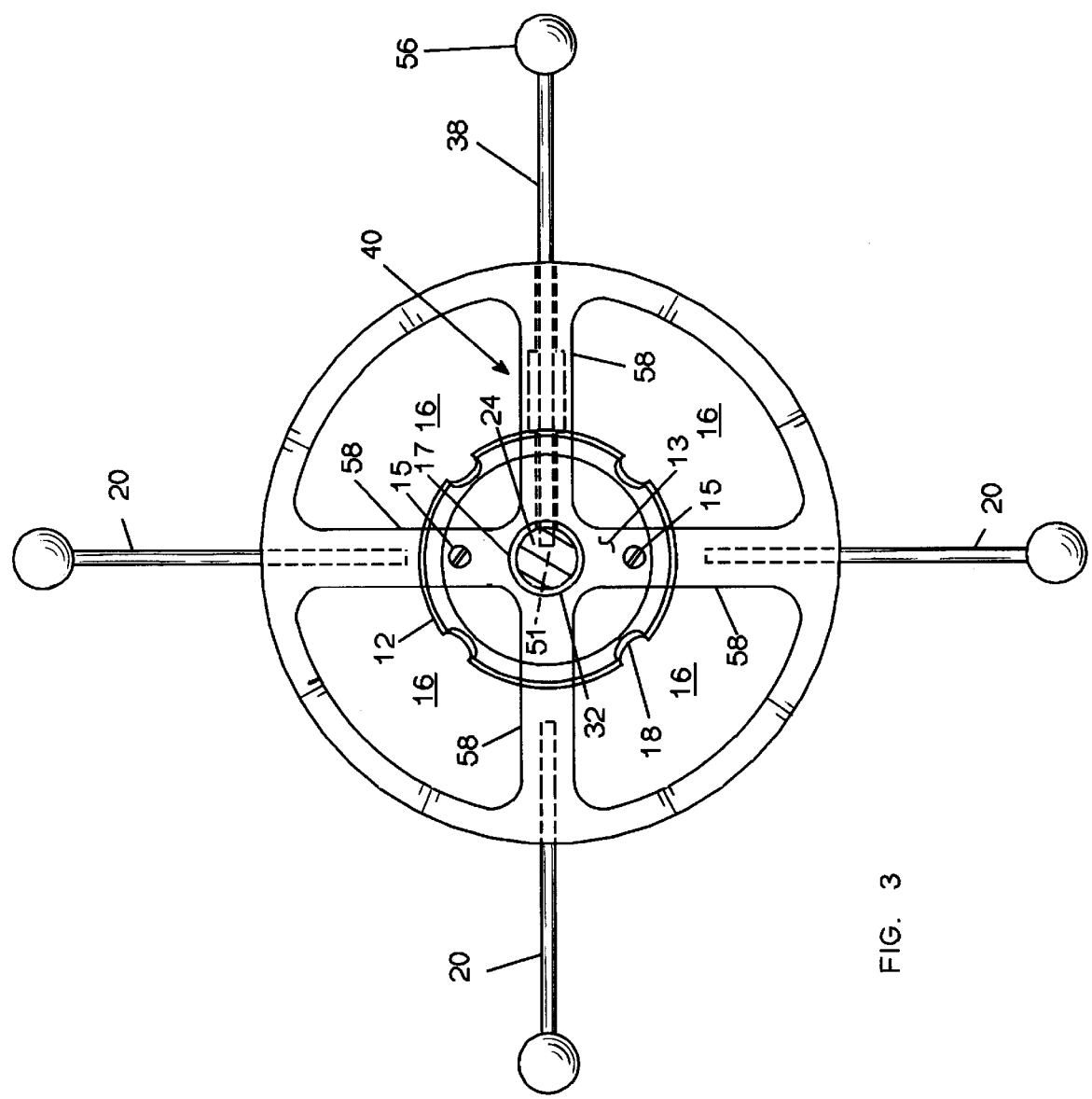
FIG. 3 is a cut-away view taken along lines 3—3 of FIG. 2.

FIG. 3 shows configuration of the top of base 14. Here, positioning of reservoir 12 illustrates how the bird feed flows from reservoir 12 into cavities 16 via openings 18. The cavities 16 may be separated by walls 58, which serve to stiffen the base and provide a reinforced region for receiving perches 20 and 38, with the locking mechanism 40 incorporated in one of walls 58. Alternately, base 14 may be provided with a single cavity extending around the upper surface of base 14, with locking mechanism 40 positioned beneath the cavity.

Having thus described construction of my birdfeeder and the manner of its use, it should be apparent that incidental changes may be made thereto that fairly fall within the scope of the following appended claims, wherein I claim:

1. A birdfeeder comprising:

a first subassembly further comprising:

a protective top configured for protecting exposed bird feed and birds therebeneath from precipitation, a lock rod attached at one end to said protective shield, and configured at an opposite end for receiving a locking member, a second subassembly comprising:
a base having at least one open cavity for receiving and holding said bird feed, said base protected from said precipitation by said protective top,
a bird feed reservoir attached to said base and enclosed at an upper end by said protective top, said bird feed reservoir having at least one opening in communicating relation with said cavity so that said bird feed flows from said reservoir into said cavity as it is consumed,
a tubular member extending from said base and positioned within said reservoir for receiving said lock rod so that said end of said lock rod configured for receiving said locking member extends into said base through said tubular member,
a locking mechanism contained within said base, said locking mechanism including said locking member for releasably engaging said end of said lock rod configured for receiving said locking member, said locking mechanism further including actuation means operable from an exterior of said base for actuating said locking mechanism to release and engage said lock rod, whereby said first subassembly may be separated from said second subassembly.

2. A birdfeeder as set forth in claim 1 wherein said bird feed reservoir has a volume sufficient to hold a gallon-sized container of bird feed.

3. A birdfeeder as set forth in claim 2 wherein said birdfeed reservoir is configured to hold said bird feed substantially over and above birds feeding at said birdfeeder, whereby a greater area on said base protected by said top is made available for birds.

4. A birdfeeder as set forth in claim 1 wherein said opposite end of said lock rod comprises a groove extending around a periphery of said lock rod near said opposite end.

5. A birdfeeder as set forth in claim 4 wherein said locking member further comprises a spring-biased pin that releasably engages said groove.

6. A birdfeeder as set forth in claim 5 wherein said spring-biased pin extends generally horizontally from said base, and is configured on an exterior of said base as a perch for birds, whereby as said perch is pulled outward, said pin is withdrawn from said groove, releasing said lock rod so that said first subassembly is separable from said second subassembly.

7. A birdfeeder separable into two subassemblies comprising:

a first subassembly comprising:
a protective top,
a lock rod secured to an underneath side of said protective top and extending downward from said protective top, said lock rod including means engagable by a locking member, for releasable locked engagement with said locking member,
a second subassembly comprising:
a generally circular base having at least one cavity in an upper side thereof for receiving bird feed,
a reservoir for holding a quantity of bird feed and configured so that a substantial portion of said bird feed is held above and over birds resting on said base, making additional space available under said protective top at said base for protection of said bird feed and birds, said reservoir having at least one opening communicating with said cavity so that said bird feed flows from said reservoir into said cavity as it is consumed,
a tubular member extending from said base upward through said reservoir for receiving said lock rod,
a catch including said locking member, said catch mounted in said base so that said locking member releasably engages said lock rod,
whereby upon said catch operated to release said lock rod, said first subassembly is releasable from said second subassembly so that said reservoir may be refilled, after which said lock rod is inserted in said tubular member so that said locking member engages said means engagable by said locking member on said lock rod, securing said first subassembly and said second subassembly together.

8. A birdfeeder as set forth in claim 7 wherein said protective top has a diameter at least twice as large as a diameter of said base.

9. A birdfeeder as set forth in claim 7 wherein said reservoir is configured as an inverted truncated cone.

10. A birdfeeder as set forth in claim 9 wherein a diameter of said base is at least twice as large as a diameter of said truncated end of said cone.

11. A birdfeeder as set forth in claim 7 wherein said reservoir has a volume sufficient to hold a gallon-sized container of bird feed.

12. A birdfeeder as set forth in claim 7 wherein said catch is operated by a bird perch.

* * * * *